(12) United States Patent
Soejima

(10) Patent No.: US 8,266,253 B2
(45) Date of Patent: Sep. 11, 2012

(54) SERVER SYSTEM AND EVENT MESSAGE TRANSMISSION METHOD THEREFOR, CLIENT TERMINAL AND CONNECTION METHOD AND PROGRAM THEREFOR, AND RECORDING MEDIUM

(75) Inventor: Kenji Soejima, Minato-ku (JP)

(73) Assignee: NEC Corporation, Tokyo (JP)

( * ) Notice: Subject to any disclaimer, the term of this patent is extended or adjusted under 35 U.S.C. 154(b) by 93 days.

(21) Appl. No.: 12/812,018

(22) PCT Filed: Dec. 19, 2008

(86) PCT No.: PCT/JP2008/073194
§ 371 (c)(1),
(2), (4) Date: Jul. 7, 2010

(87) PCT Pub. No.: WO2009/087885
PCT Pub. Date: Jul. 16, 2009

(65) Prior Publication Data
US 2010/0293252 A1    Nov. 18, 2010

(30) Foreign Application Priority Data
Jan. 8, 2008    (JP) .................................. 2008-001193

(51) Int. Cl.
*G06F 15/16*    (2006.01)

(52) U.S. Cl. ........................................ 709/219; 709/228
(58) Field of Classification Search .................. 709/203, 709/227–228, 217–219
See application file for complete search history.

(56) References Cited

U.S. PATENT DOCUMENTS

| 6,311,206 | B1 | 10/2001 | Malkin et al. | |
| 7,996,538 | B2 * | 8/2011 | Kikkawa et al. | 709/227 |
| 2002/0042830 | A1 * | 4/2002 | Bose et al. | 709/230 |
| 2003/0097448 | A1 * | 5/2003 | Menezes et al. | 709/227 |
| 2004/0151132 | A1 | 8/2004 | Terashima et al. | |
| 2006/0195545 | A1 * | 8/2006 | Kikkawa et al. | 709/217 |
| 2011/0276702 | A1 * | 11/2011 | Marchev et al. | 709/228 |

FOREIGN PATENT DOCUMENTS

| JP | 10-027146 A | 1/1998 |
| JP | 2000-232446 A | 8/2000 |
| JP | 2002-342201 A | 11/2002 |
| JP | 2004-227121 A | 8/2004 |
| JP | 2005-202687 A | 7/2005 |
| JP | 2007-034956 A | 2/2007 |

* cited by examiner

*Primary Examiner* — Abdullahi Salad
(74) *Attorney, Agent, or Firm* — Sughrue Mion, PLLC

(57) ABSTRACT

The present invention provides techniques for allowing a server system to reduce the amount of communications and perform efficient operations. A server system returns an event message in response to an HTTP request including an application identifier from a client terminal. The server system comprises a first through a fourth server, where the first server receives the HTTP request from the client device and transfers the HTTP request to a plurality of installed second servers, the third server transmits a server identifier of the second server, to which the HTTP request has been transferred, to the fourth server after the HTTP request has been made, and the fourth server transmits an application identifier included in the HTTP request and an event message to the second transmission server indicated by the server identifier, and the second server suspends the HTTP request transferred from the request reception server, and transmits the HTTP request to the client device when it receives the event message from the fourth server.

6 Claims, 10 Drawing Sheets

SERVER SYSTEM AND EVENT MESSAGE TRANSMISSION METHOD THEREFOR, CLIENT TERMINAL AND CONNECTION METHOD AND PROGRAM THEREFOR, AND RECORDING MEDIUM

TECHNICAL FIELD

The present invention relates to a server system which utilizes an HTTP protocol, and more particularly to a server system, a method, and a program for efficiently controlling connections to clients.

BACKGROUND ART

Patent Document 1 (JP2004-227121A) discloses techniques for managing home electric products and the like over a network using HTTP (Hypertext Transfer Protocol) as an HTTP communication system.

Patent Document 1 describes that when an access point located within an indoor network has an address which is accessible from the outside, the access point is susceptible to unauthorized actions and implies problems in regard to the security as well.

Patent Document 1 also proposes a polling approach as a method which does not require that access points be installed indoors. According to Patent Document 1, when the polling approach is employed, an extra server is installed on an external network for confirming whether or not a request has been made, and this server received query from an indoor communication device as appropriate to confirm whether or not an operation request has been made. However, if such a configuration is employed, communication must be made each time the confirmation is made. Thus, if the confirmation is frequently made for a short time period in order to responsibly process a given control request with good responsibility, this confirmation will entail an immense communication cost.

Patent Document 1 describes an invention, based on the premise of the foregoing facts, which comprises an ASP (Application Service Provider) server installed outdoors, a communication device connected to an indoor network, and a terminal device capable of connecting to the ASP server, where the ASP server includes a signal receiver for receiving a control signal from an operation terminal, and upon receipt of a reception request from the communication device, the ASP server suspends a response to the reception request until it receives a control signal from the operation terminal, and upon receipt of the control signal from the terminal device at the signal receiver, transmits a response including information on this signal to the communication device.

Patent Document 1: JP2004-227121A

DISCLOSURE OF THE INVENTION

The invention described in the aforementioned Patent Document 1 has a first problem in which a reception request from the communication device is suspended until the signal receiver receives a control signal from the terminal device, so that large memory capacity is required, and the system configuration suffers from low efficiency.

Also, the invention described in Patent Document 1 relates to a management system for handling a single application, which does not take into consideration an environment in which a plurality of applications exist together, and therefore encounters difficulties in building an environment in which a plurality of applications exist together on a server system.

Further, since Patent Document 1 does not discuss how to cope with failures and does not focus attention on measures for recovery from such failures, the overall system can fail to function normally if a failure occurs in a component thereof for controlling a function of the server system that is required for communicating with a client.

It is an object of the present invention to provide techniques for implementing a session management system which is capable of reducing the amount of processing and the amount of communications of a server system, to allow the system to efficiently operate in an environment in which a plurality of applications exist together in the server system.

It is another object of the present invention to provide, in addition to realizing the foregoing object, techniques for implementing a recovery system which allow a server to transmit an event message to a client even in the event of a system failure in the server, without losing the message, in a system to which multiple clients are connected.

The present invention provides a server system for returning an event message in response to an HTTP request from a client terminal, where the HTTP request includes an application identifier. The server system comprises a request reception server, a plurality of installed event message transmission servers, a client management server, and an application server, and is characterized in that:

the request reception server receives the HTTP request from the client device, and transfers the HTTP request to an event message transmission server, the client management server stores therein a set of the client device, which has made the HTTP request, and an event message transmission server to which the HTTP request is transferred, and is responsive to the HTTP request to transmit a server identifier of the event message transmission server to which the HTTP request has been transferred to the application server, and the application server, upon receipt of the identifier of the event message transmission server after the HTTP request has been made, transmits an application identifier included in the HTTP request and an event message to an event message transmission server indicted by the server identifier, and the event message transmission server suspends the HTTP request transferred from the request reception server, and upon receipt of the event message from the application server, transmits the event message to the client device as an HTTP response.

The present invention provides a client terminal for transmitting an HTTP request including an application identifier to the aforementioned server system. The client terminal comprises:

a reconnection attempt unit for transmitting a request based on an HTTP protocol to the request reception server, and for attempting a reconnection to the request reception server when the reconnection attempt unit completes the reception of a response to the request.

The present invention provides an event message transmission method performed in a server system for returning an event message in response to an HTTP request including an application identifier from a client terminal, where the server system comprises a request reception server, a plurality of installed event message transmission servers, a client management server, and an application server. The method is characterized by comprising the steps of:

the request reception server receiving the HTTP request from the client device, and transferring the HTTP request to an event message transmission server;

the client management server storing therein a set of the client device, which has made the HTTP request, and an event message transmission server to which the HTTP request is transferred, and transmitting a server identifier of the event message transmission server to which the HTTP request has been transferred to the application server when the HTTP request is made;

upon receipt of the identifier of the event message transmission server after the HTTP request has been made, the application server transmitting an application identifier included in the HTTP request and an event message to an event message transmission server indicted by the server identifier; and the event message transmission server suspending the HTTP request transferred from the request reception server, and upon receipt of the event message from the application server, transmitting the event message to the client device as an HTTP response.

The present invention provides a connection method performed in a client terminal for transmitting an HTTP request including an application identifier to the aforementioned server system, wherein:

a request is transmitted to the request reception server based on an HTTP protocol, and a reconnection is attempted to the request reception server when reception of a response to the request is completed.

The present invention provides a program for causing a computer to execute a connection method performed in a client terminal for transmitting an HTTP request including an application identifier to the aforementioned server system, wherein:

the program causes the computer to execute processing for transmitting a request based on an HTTP protocol to the request reception server, and attempting a reconnection to the request reception server when reception of a response to the request is completed.

The present invention provides a recording medium which has the program stored thereon.

DESCRIPTION OF REFERENCE NUMERALS

100, 110, 120, 130, 140 Server Devices
150, 160 Client Devices
101 Query Unit
102 Delivery Unit
103 Recording Unit
104 Transmission Unit
105 Session Permission Unit
106 Search Unit
107 Transfer Unit
111 Reception Unit
112 Suspension Unit
113 Identifier Transmission Unit
114 Response Transmission Unit
131 Response Recording Unit
132 Search Return Unit
133 Corresponding Information Recording Unit
134 Corresponding Information Return Unit
135 Detection Unit
141 Application Initiation Unit
142 Identifier Transmission Unit
143 Reception Unit
144 Event Transmission Unit
151 Initialization Message Transmission Unit
153 Reception Unit
154 Reconnection Attempt Unit
A1-A29, B1-B9 Steps

BEST MODE FOR CARRYING OUT THE INVENTION

Next, embodiments of the present invention will be described with reference to the drawings.

Figure 1:
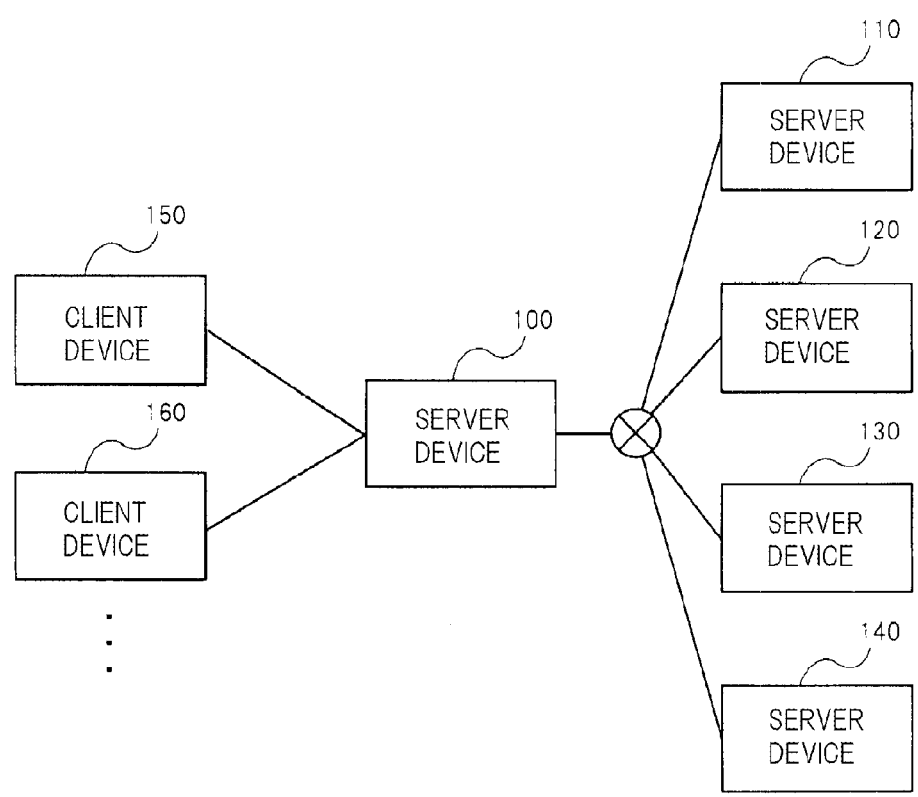
[FIG. 1]
A block diagram showing the configuration of a first embodiment of a communication system according to the present invention.

FIG. 1 is a block diagram showing the configuration of a first embodiment of a communication system according to the present invention.

Referring to FIG. 1, this embodiment comprises server device 100 which is a request reception server, server device 110 and server device 120 which are event message transmission servers, server device 130 which is a client management server, server device 140 which is an application server, client device 150, and client device 160.

Figure 2:
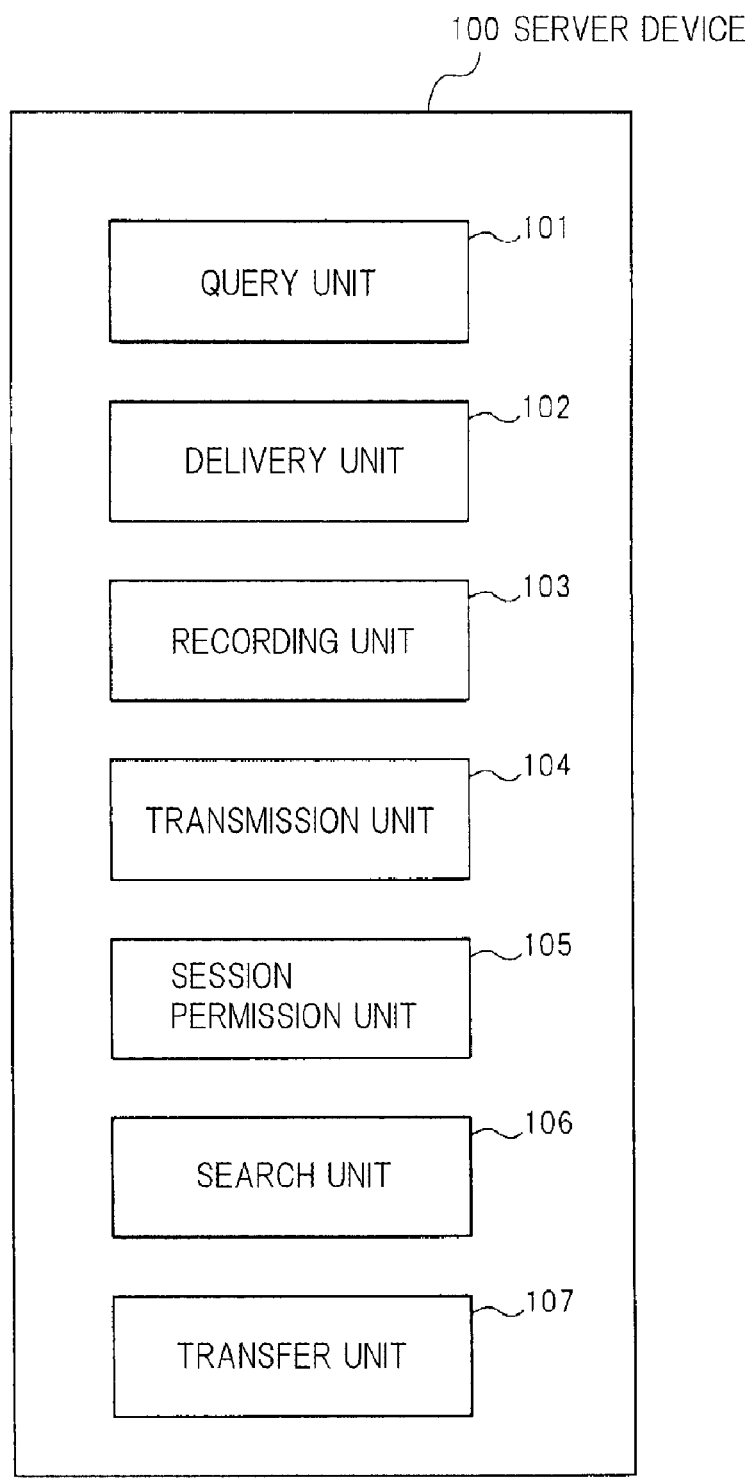
[FIG. 2]
A block diagram showing main components of server device 100 in FIG. 1.

FIG. 2 is a block diagram showing main components of server device 100.

Query unit 101 queries server device 130 whether or not server device 130 has been registered with an application identifier included in an initialization message transmitted from client device 150 and client device 160 using the application identifier as a key.

Delivery unit 102 delivers a session management ID in accordance with the result of query unit 101.

Recording unit 103 records a correspondence of the session management ID delivered by delivery unit 102 to client device 150 and client device 160.

Transmission unit 104 transmits the session management ID delivered by delivery unit 102 to client device 150 and client device 160.

Session permission unit 105 confirms whether a session management ID included in a session start message from client device 150 and client device 160 exists in a database recorded in recording unit 103, and rejects the start of a session when the session management ID does not exist in the database.

Search unit 106 searches server device 110 or server device 120 which is processing a connection of an application identifier, included in the session start message from client device 150 and client device 160, to server device 130, using the application identifier as a key.

Transfer unit 107 transfers the session start message to server device 110 or server device 120 which is processing the connection request of the application identifier, found by search unit 106.

Figure 3:
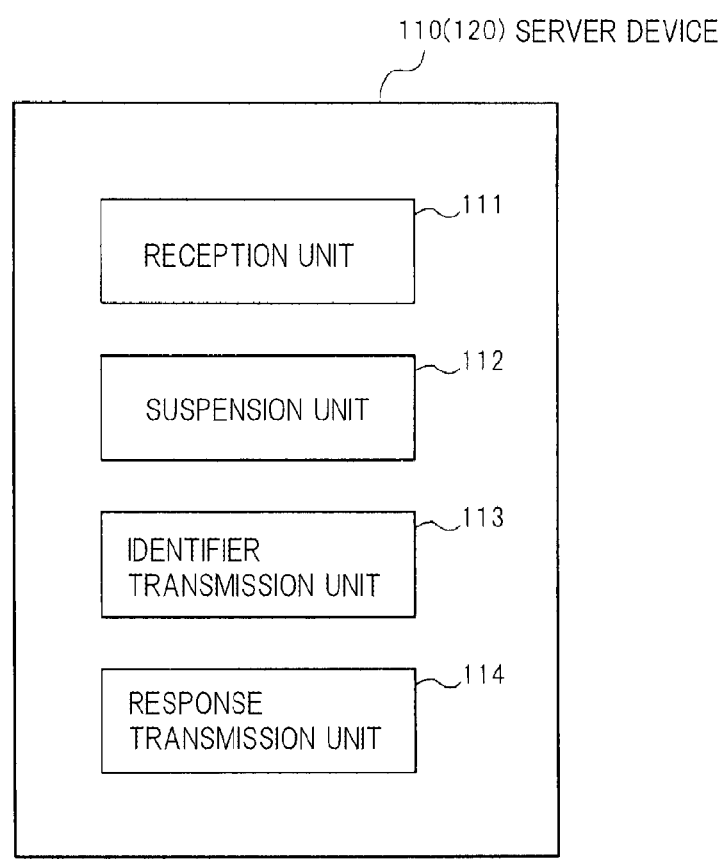
[FIG. 3]
A block diagram showing main components of server device 110 (and server device 120) in FIG. 1.

FIG. 3 is a block diagram showing main components of server device 110 (and server device 120).

Reception unit 111 receives a session start message from client device 150 and client device 160, transferred by server device 100.

Suspension unit 112 suspends the received session start message for a certain period.

Identifier transmission unit 113 transmits an application identifier included in the received session start message to server device 130.

Response transmission unit 114 transmits an event message transmitted from server device 140 as a response to the session start message suspended by suspension unit 112.

Figure 4:
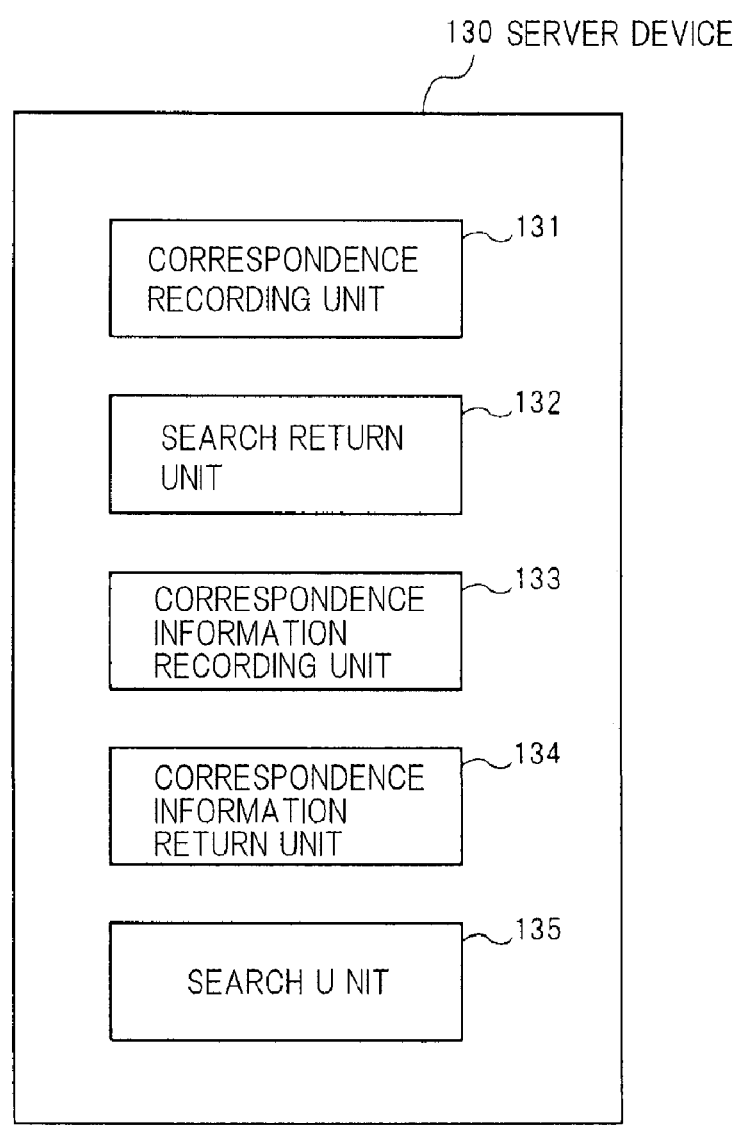
[FIG. 4]
A block diagram showing main components of server device 130 in FIG. 1.

FIG. 4 is a block diagram showing main components of server device 130.

Correspondence recording unit 131 of server device 130 records the correspondence of an application ID and a network identification name notified by an application which runs on server device 140.

Search return unit 132 makes a search from an initialization message transmitted from server device 100 to determine whether or not the same application ID as an application ID included in the initialization message, and the network identification name of server device 140 are recorded in correspondence recording unit 131, and returns them to server device 100.

Correspondence information recording unit 133 records correspondence information of server device 110 or server device 120 connected to client device 150 and client device 160 together with an application ID.

Correspondence information return unit 134 searches for correspondence information and application ID, recorded by correspondence information recording unit 133, of server device 110 or server device 120 connected to client device 150 and client device 160, using the application ID as a key, and returns the retrieved correspondence information and application ID.

Detection unit 135 detects the fact that server device 110 and server device 120 are down due to a failure.

Figure 5:
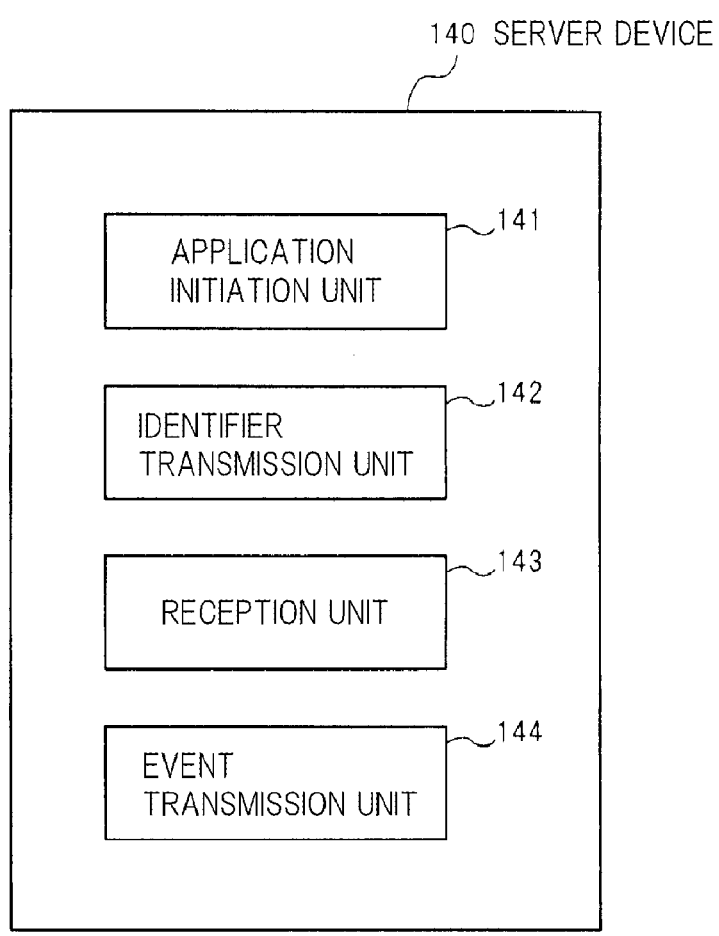
[FIG. 5]
A block diagram showing main components of server device 140 in FIG. 1.

FIG. 5 is a block diagram showing main components of server device 140.

Application initiation unit 141 runs an application.

Identifier transmission unit 142 transmits an application identifier for identifying the initiated application to server device 130.

Reception unit 143 transmits a request to server device 130 for a search for correspondence information, recorded by correspondence information recording unit 133, of server device 110 or server device 120 connected to client device 150 and client device 160, using the application identifier as a key, and receives the result of the search.

Event transmission unit 144 transmits an event message to server device 110 or 120.

Figure 6:
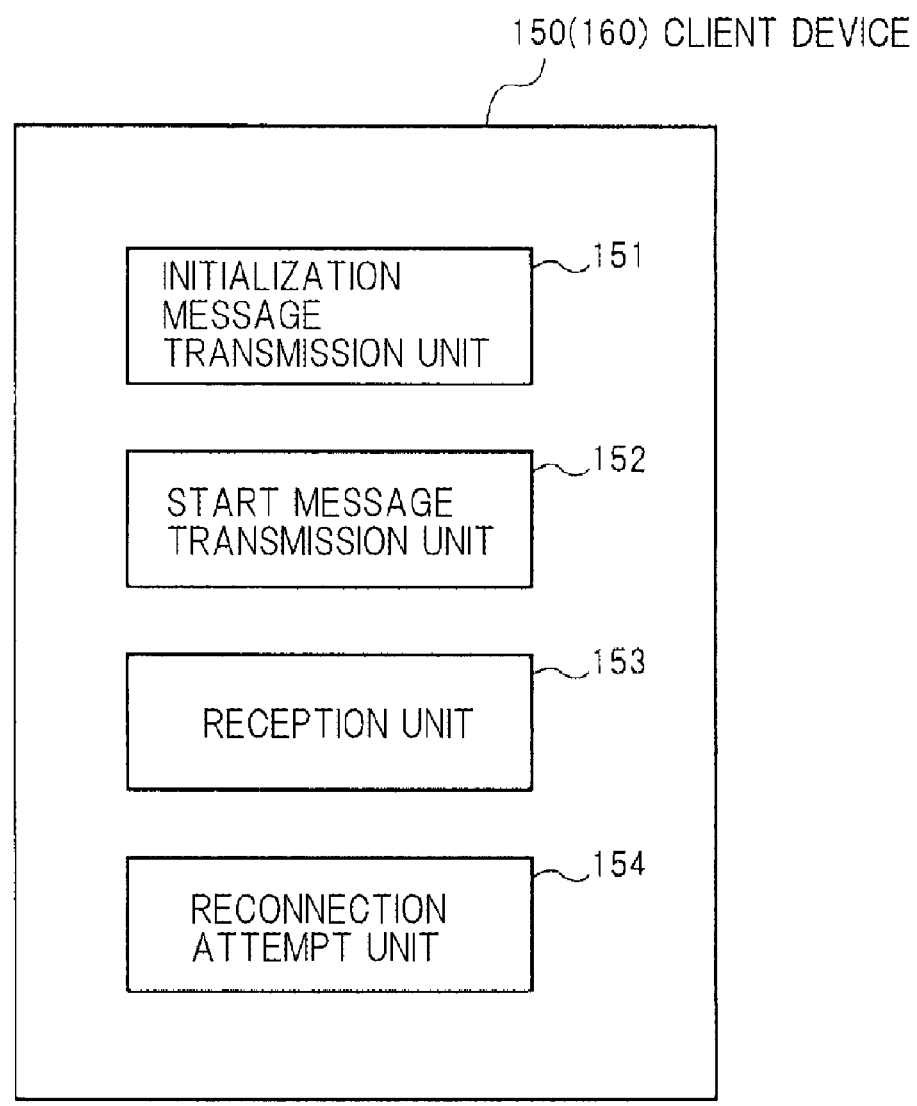
[FIG. 6]
A block diagram showing main components of client device 150 (and client device 160) in FIG. 1.

FIG. 6 is a block diagram showing main components of client device 150 (and client device 160).

Initialization message transmission unit 151 transmits an initialization message to server device 100.

Start message transmission unit 152 transmits a session start message to server device 100.

Reception unit 153 receives an event message from server device 110 or server device 120.

Reconnection attempt unit 154 automatically attempts a reconnection to server device 100 upon completion of the transmission of the session start message or the reception of a response.

Notably, each of the foregoing devices is implemented by a general computer system. While the following description will be mainly given of each component responsible for specific processing, the operation of each component is performed by a control device (not shown) equipped in each component.

Figure 7:
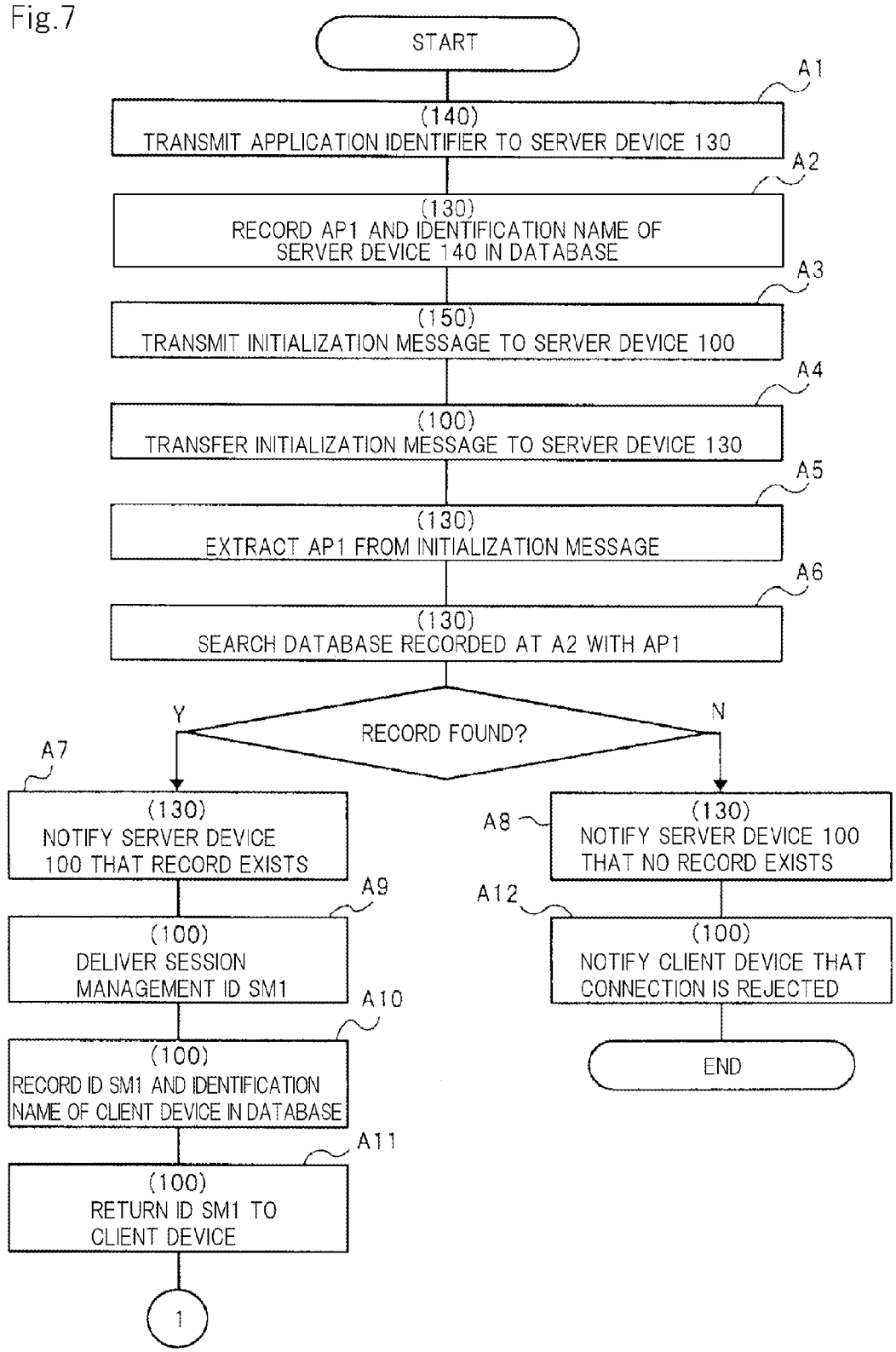
[FIG. 7]
A flow chart showing the operation of the embodiment shown in FIG. 1.
Figure 8:
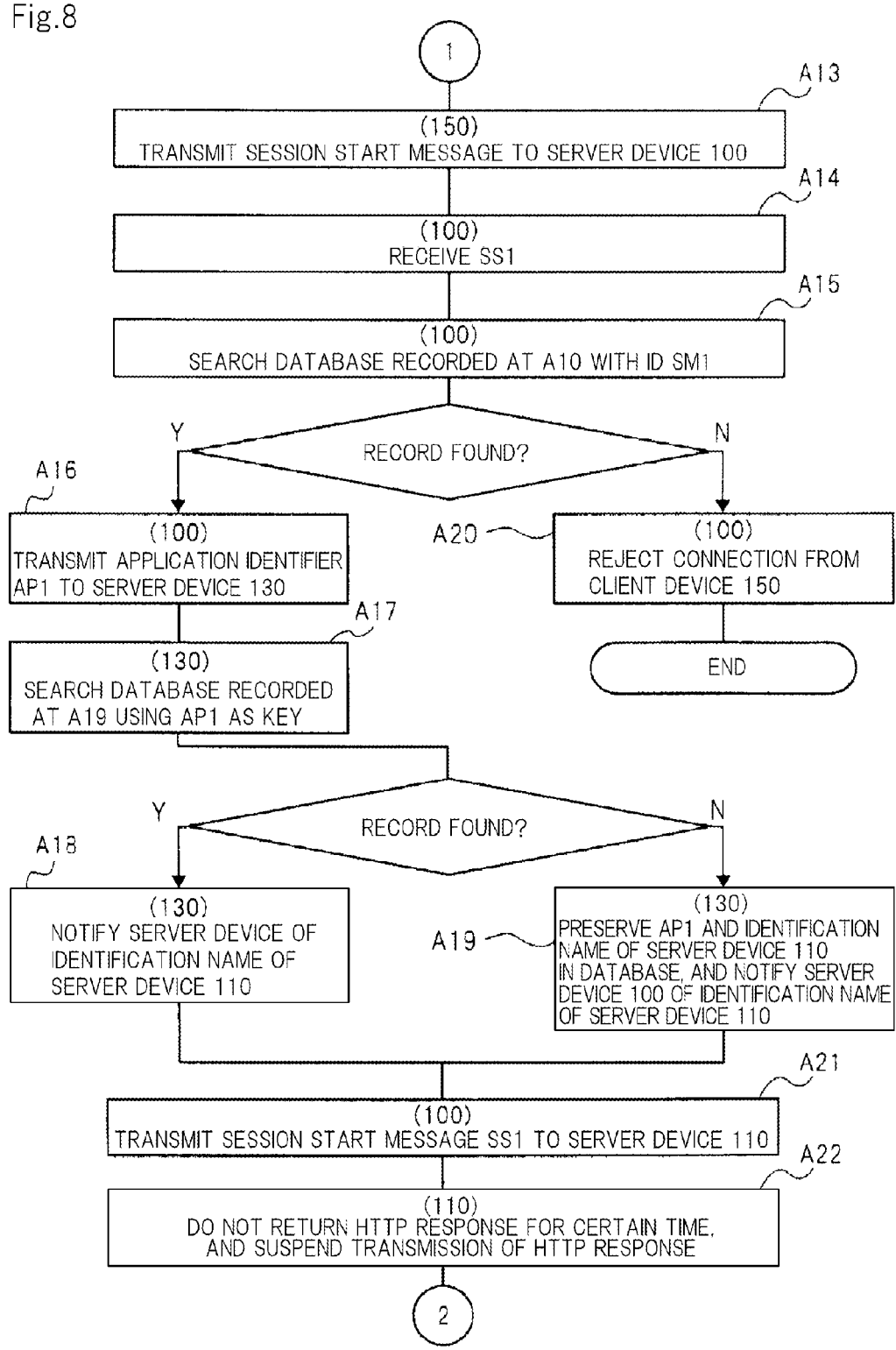
[FIG. 8]
A flow chart showing the operation of the embodiment shown in FIG. 1.
Figure 9:
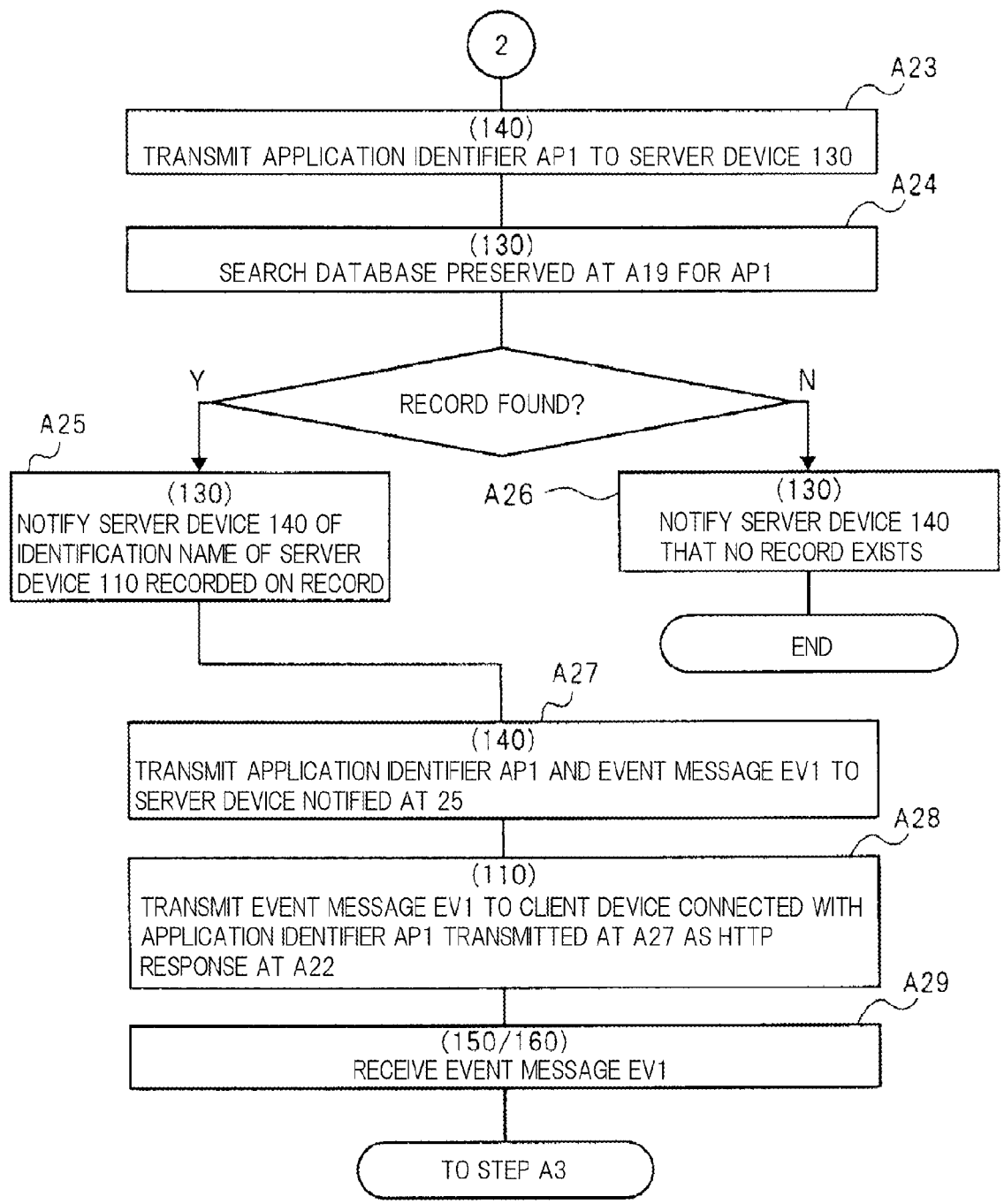
[FIG. 9]
A flow chart showing the operation of the embodiment shown in FIG. 1.

FIGS. 7 through 9 are flow charts showing the operation of this embodiment. In the following, the overall operation of this embodiment will be described in detail with reference to the respective figures.

First, an application initiated by application initiation unit 141 of server device 140 transmits application identifier AP1 for identifying the application itself to server device 130 (step A1).

Upon receipt of application identifier AP1 transmitted at step A1, server device 130 records a set of received application identifier AP1 and an identification name (IP address, host name or the like) of server device 140 which has transmitted the application identifier in correspondence recording unit 131 which serves as a database (step A2).

Initialization message transmission unit 151 of client device 150 transmits an initialization message to server device 100 as an HTTP request (step A3). In this event, application identifier AP1 is attached to the initialization message.

When server 100 receives the initialization message from client device 150, query unit 101 transfers the initialization message to server device 130 (step A4), and queries whether or not an application indicated by application identifier AP1 has been registered in server device 130.

When the server device 130 receives the initialization message, session permission unit 105 extracts the application identifier AP1 from the initialization message (step A5), and searches correspondence recording unit 131 to determine whether correspondence recording unit 131 has stored a record including the same application identifier as application identifier AP1 (step A6).

When a record including the same application identifier as application identifier AP1 is found in correspondence recording unit 131, as a result of the search at step A6, search return unit 132 notifies server device 100 that the record exists (step A7).

On the other hand, when a record including the same application identifier as application identifier AP1 is not found in correspondence recording unit 131, as a result of the search at step A6, search return unit 132 notifies server device 100 that such a record does not exist (step A8).

When server unit 100 receives notification that the record exists at step A7, delivery unit 102 delivers session management ID SM1 having a unique value (step A9), and recording unit 103 records therein session management ID SM1 and the identification name (IP address, host name or the like) of client device 150 (step A10). Subsequently, transmission unit 104 returns session management ID SM1 to client device 150 (step A11).

Upon receipt of the notification that the record does not exist at step A8, server device 100 forces transmission unit 104 to notify client device 150 that the connection is rejected, followed by termination of the process (step A12).

After step A11, client device 150, which has received session management ID SM1, forces start message transmission unit 152 to transmit session start message SS1 to server device 100. In this event, session start message SS1 includes session management ID SM1 returned at step A11 and application identifier AP1 (step A13).

When server device 100 receives session start message SS1 from client device 150 (step A14), session permission unit 105 extracts session management ID SM1 included in session start message SS1 from client device 150, and searches recording unit 103 recorded at step A10 to determine whether a record including session management ID SM1 exists in recording unit 103 (step A15).

When a record including session management ID SM1 exists in the database as a result of the search at step A15, search unit 106 of server device 100 transmits application identifier AP1 included in session start message SS1 to server device 130 (step A16).

Upon receipt of application identifier AP1 sent at step A16, correspondence information search unit 134 of server device 130 searches correspondence information recording unit 133 using received application identifier AP1 as a key (step A17).

When a pertinent record is found in correspondence information recording unit 133 as a result of step A17, correspondence information search unit 134 notifies server device 100 of the identification name (IP address, host name or the like) of server device 110 recorded in the pertinent record (step A18).

On the other hand, when no pertinent record is found in correspondence information recording unit 133 as a result of step A17, correspondence information search unit 134 preserves a set of application identifier AP1 and the identification name (IP address, host name or the like) of server device 110 in correspondence information recording unit 133, and notifies server device 100 of the identification name of server device 110 (step A19). In this event, however, if the processing operations executed by server 110 are not considered reliable due to performance concerns, server device 120 is assigned instead, and server device 100 is notified of the identification name of server device 120.

When it is confirmed, as a result of the search at step A15, that the database does not store a record including session management ID SM1, session permission unit 105 of server device 100 rejects a connection from client device 150, followed by termination of the process (step A20).

Next, transfer unit 107 of server device 100 transmits session start message SS1 to server device 110 (step A21).

Upon receipt of session start message SS1, reception unit 111 of server device 110 does not return an HTTP response for a certain time but suspends session start message SS1 in suspension unit 112 (step A22).

After a request to initiate a session has been made, processing from step A3 to step A22 is relied on by client device 160 until a session is started, where the same application identifier AP1 is included in the initialization message and the session start message. For facilitating the understanding, important points will be described below.

The processing is executed from step A3 to step A16.

Next, the process proceeds to step A17, where search return unit 132 of server device 130 confirms whether or not the identification name (IP address, host name or the like) of server device 110 has been recorded in correspondence recording unit 131 using application identifier AP1 as a key. Since it is confirmed here that the identification name has been recorded, search return unit 132 notifies server device 100 of the identification name of server device 110 at step A18.

The processing is executed at steps A18 through A19 and steps A21 through A22, and client device 150 and client device 160 are processed by the same server device 110. p Next, a description will be given of processing which is involved in sending an event message to client device 150 and client device 160 by an application which runs on server device 140.

The application running on server device 140 causes identifier transmission unit 142 to transmit application identifier AP1 to server device 130 (step A23).

In server device 130, correspondence information return unit 134 searches correspondence information recording unit 133, in which application identifier AP1 and the identification name (IP address, host name or the like) of server device 110 have been preserved at step A19, using received application identifier AP1 as a key (step A24).

When a pertinent record is found in correspondence information recording unit 133 as a result of the search at step A24, correspondence information return unit 134 notifies server device 140 of the identification name (IP address, host name or the like) of server device 110 recorded in the record (step A25). In this event, when server device 120 is also processing a client connection for application identifier AP1, server device 140 is notified of a list of the identification names of server device 110 and server device 120.

When no pertinent record is found in correspondence information recording unit 133 as a result of the search at step A24, correspondence information return unit 134 notifies server device 140 that no pertinent record exists, followed by termination of the process (step A26).

The application running on server device 140 causes identification transmission unit 141 to transmit application identifier AP1 and event message EV1 to server device 110 (or server device 110 and server device 120) notified at step A25 (step A27).

Next, response transmission unit 114 of server device 110 (or server device 110 and server device 120) returns event message EV1 to client device 150 and client device 160 connected with application identifier AP1 transmitted at step A27, as the HTTP response at step A22 (step A28).

Reception units 153 of client device 150 and client device 160 receive event message EV1 (step A29).

Next, client device 150 and client device 160 again execute the processing from step A3 for receiving the next event message.

Next, a second embodiment of the present invention will be described in detail with reference to the drawings.

Figure 10:
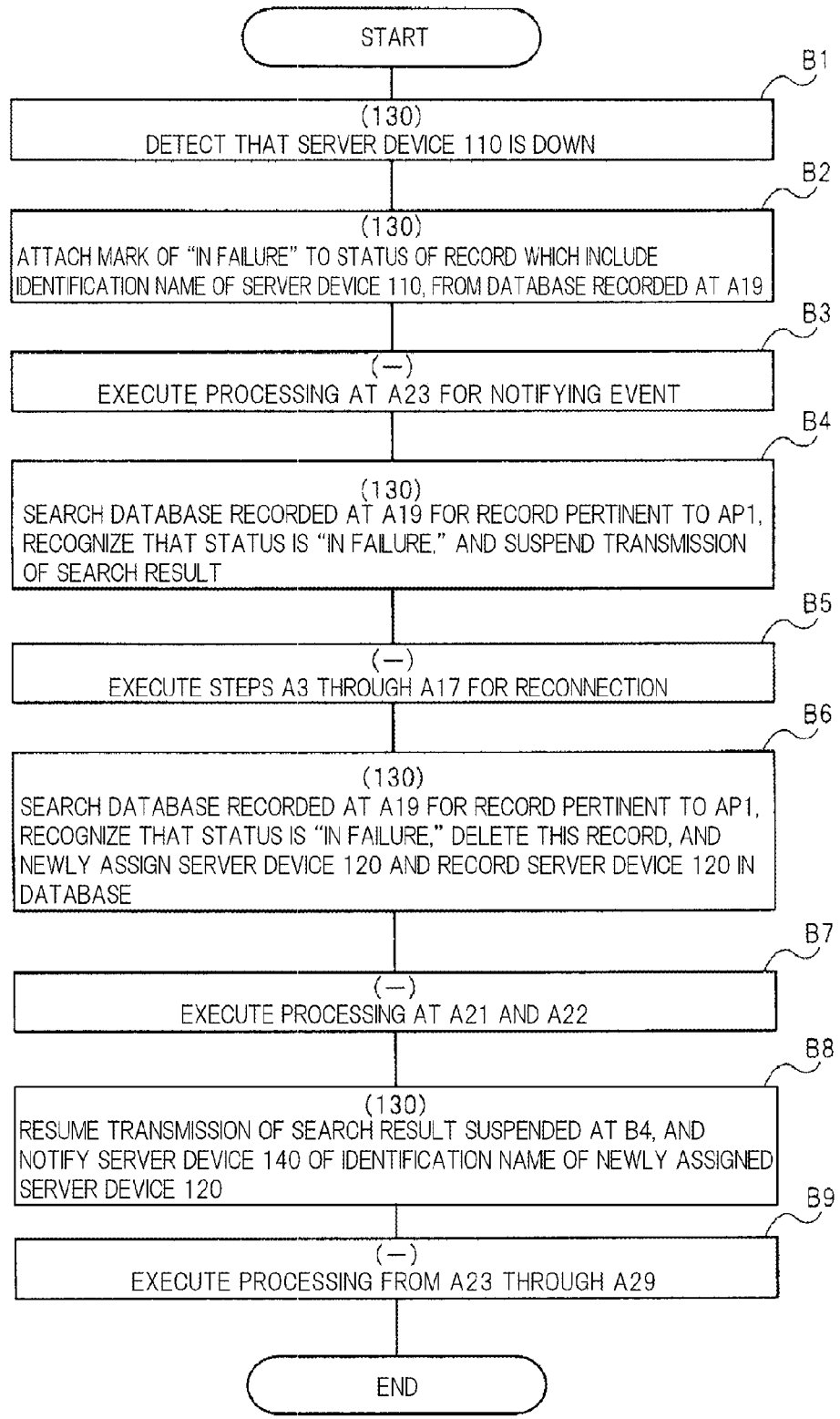
[FIG. 10]
A block diagram showing the configuration of a second embodiment of a communication system according to the present invention.

This embodiment is similar in configuration to the first embodiment shown in FIGS. 1 through 6. FIG. 10 is a flow chart showing the operation of this embodiment. In the following, the overall operation of this embodiment will be described in detail with reference to FIGS. 1 through 6 and FIG. 10.

Assume that client device 150 and client device 160 have executed the processing from step A3 to step A22, and have been connected to server device 110. The following description is given of the operation immediately after server 110 fails and does into a down state.

Detection unit 135 of server device 130 detects that server device 110 is down (step B1).

Next, the controller of server device 130 attaches a mark indicative of "in failure" to the status of a record including the identification name of server device 110 within correspondence information recording unit 133 recorded at step A19 (step B2).

Next, server device 140 on which an application is running, executes processing at step A23 for an event message, and identifier transmission unit 142 transmits application identifier AP1 to server device 130 (step B3).

Next, correspondence information return unit 134 of server device 130 searches correspondence information recording unit 133 recorded at step Al 9 for a record pertinent to application identifier AP1, confirms that the status is "in failure," and suspends the transmission of the search result to server device 140 (step B4).

Client device 150 and client device 160 execute steps A3 through step A11 for reconnection (step B5).

Correspondence information return unit 134 of server device 130 confirms that the status of the record pertinent to application identifier AP1 is "in failure" in the processing at step A17, deletes this record, and then newly assigns server device 120 and records the same in the database (step B6).

Next, the processing is executed at step A21 and A22 (step B7).

Next, correspondence information return unit 134 of server device 130 resumes the transmission of the search result, suspended at step B4, and notifies server device 140 of the identification name (IP address, host name or the like) of newly assigned server device 120 (step B8).

The processing is executed from step A23 through A29 (step B9).

At step B8 described above, the transmission of the search result to server device 140 can be further suspended for a certain time, such that the processing can be temporarily stopped until reconnections are made to a majority of client devices which had been connected to server device 110 before it failed.

As described above, each of the foregoing devices is implemented by a general computer system. Particularly, the client device is used by a general user which connects to the server system, and initialization message transmission unit 151, start message transmission unit 152, reception unit 153, and reconnection attempt unit 154, which make up the client device, are built on a computer system by a program stored on a recording medium such as CD-ROM, DVD-ROM or the like or a program delivered through the web. Accordingly, the present invention includes such programs and recording media as well.

According to the present invention, the server system can be applied to such applications as a broadcast delivery system for disaster prediction information, traffic information and the like. Also, the server system of the present invention can be utilized in an application for reacting to an event from a client such as an entertainment system for providing a quiz game to simultaneously transmit the event to remaining clients.

A first advantage provided by the configuration of the present invention lies in that the amount of communication processing can be reduced for an event message transmitted from an application server to client devices. This is because when a client device attempts to connect to an event message transmission server, an application identifier is decided as a key, and requests specified with the same application identifier are collected in the same event message transmission server, thus reducing event message transmission servers which should receive the event message, and thus reducing the total amount of communication processing.

A second advantage lies in that even if an event message transmission server connected to a client device is down due to a failure, an event message from an application server can be suspended until a client management server connects to a new event message transmission server, so that the event message can be transmitted to the client device without losing the event message.

The foregoing advantages rely on the following reason. When the application server transmits an event to the event message transmission server, the application server is configured to query the client management server to retrieve a list of event message transmission servers to which the event should be transmitted. The client management server, upon detection of an event message transmission server being down, is configured to suspend a list which assigns a new event message transmission server as a substitute therefor, so that the client device can reconnect to the new event message transmission server without fail.

While the present invention has been described above with reference to some embodiments, the present invention is not limited to the embodiments described above. As in the example illustrated in the first embodiment, the configuration and details of the invention of the present application are open to various modifications within the scope of the present application which will be understood by anyone having ordinary skill in the art.

This application claims priority under Japanese Patent Application No. 2008-001193 filed Jan. 8, 2008, the disclosure of which is herein incorporated by reference in its entirety.

The invention claimed is:

1. A server system for returning an event message in response to an HTTP request from a client terminal, said HTTP request including an application identifier, said server system comprising:

a request reception server, a plurality of installed event message transmission servers, a client management server, and an application server, characterized in that:

said request reception server receives the HTTP request from said client device, and transfers the HTTP request to an event message transmission server, said client management server stores therein a set of said client device, which has made the HTTP request, and an event message transmission server to which the HTTP request is transferred, and is responsive to the HTTP request to transmit a server identifier of said event message transmission server to which the HTTP request has been transferred to said application server, and said application server, upon receipt of the identifier of said event message transmission server after the HTTP request has been made, transmits an application identifier included in the HTTP request and an event message to an event message transmission server indicted by the server identifier, and said event message transmission server suspends the HTTP request transferred from said request reception server, and upon receipt of the event message from said application server, transmits the event message to the client device as an HTTP response.

2. A client terminal for transmitting an HTTP request including an application identifier to a server system, said server system comprising:

a request reception server, a plurality of installed event message transmission servers, a client management server, and an application server, wherein:

said request reception server receives the HTTP request from said client device, and transfers the HTTP request to an event message transmission server, said client management server stores therein a set of said client device, which has made the HTTP request, and an event message transmission server to which the HTTP request is transferred, and is responsive to the HTTP request to transmit a server identifier of said event message transmission server to which the HTTP request has been transferred to said application server, and said application server, upon receipt of the identifier of said event message transmission server after the HTTP request has been made, transmits an application identifier included in the HTTP request and an event message to an event message transmission server indicted by the server identifier, and said event message transmission server suspends the HTTP request transferred from said request reception server, and upon receipt of the event message from said application server, transmits the event message to the client device as an HTTP response, said client terminal comprising:

a reconnection attempt unit for transmitting a request based on an HTTP protocol to said request reception server, and for attempting a reconnection to said request reception server when said reconnection attempt unit completes the reception of a response to the request.

3. An event message transmission method performed in a server system for returning an event message in response to an HTTP request from a client terminal, said HTTP request including an application identifier, said server system comprising a request reception server, a plurality of installed event message transmission servers, a client management server, and an application server, said method characterized by comprising the steps of:

said request reception server receiving the HTTP request from said client device, and transferring the HTTP request to an event message transmission server;

said client management server storing therein a set of said client device, which has made the HTTP request, and an event message transmission server to which the HTTP request is transferred, and transmitting a server identifier of said event message transmission server, to which the HTTP request has been transferred, to said application server when the HTTP request is made;

upon receipt of the identifier of said event message transmission server after the HTTP request has been made, said application server transmitting an application identifier included in the HTTP request and an event message to an event message transmission server indicted by the server identifier; and said event message transmission server suspending the HTTP request transferred from said request reception server, and upon receipt of the event message from said application server, transmitting the event message to the client device as an HTTP response.

4. A connection method performed in a client terminal for transmitting an HTTP request including an application identifier to a server system, said server system comprising:

a request reception server, a plurality of installed event message transmission servers, a client management server, and an application server, wherein:

said request reception server receives the HTTP request from said client device, and transfers the HTTP request to an event message transmission server, said client management server stores therein a set of said client device, which has made the HTTP request, and an event message transmission server to which the HTTP request is transferred, and is responsive to the HTTP request to transmit a server identifier of said event message transmission server, to which the HTTP request has been transferred, to said application server, said application server, upon receipt of the identifier of said event message transmission server after the HTTP request has been made, transmits an application identifier included in the HTTP request and an event message to an event message transmission server indicted by the server identifier, and said event message transmission server suspends the HTTP request transferred from said request reception server, and upon receipt of the event message from said application server, transmits the event message to the client device as an HTTP response, said method comprising:

transmitting a request based on an HTTP protocol to said request reception server, and attempting a reconnection to said request reception server when the reception of a response to the request is completed.

5. A program for causing a computer to execute a connection method performed in a client terminal for transmitting an HTTP request including an application identifier to a server system, said server system comprising:

a request reception server, a plurality of installed event message transmission servers, a client management server, and an application server, wherein:

said request reception server receives the HTTP request from said client device, and transfers the HTTP request to an event message transmission server, said client management server stores therein a set of said client device, which has made the HTTP request, and an event message transmission server to which the HTTP request is transferred, and is responsive to the HTTP request to transmit a server identifier of said event message transmission server, to which the HTTP request has been transferred, to said application server, said application server, upon receipt of the identifier of said event message transmission server after the HTTP request has been made, transmits an application identifier included in the HTTP request and an event message to an event message transmission server indicted by the server identifier, and said event message transmission server suspends the HTTP request transferred from said request reception server, and upon receipt of the event message from said application server, transmits the event message to the client device as an HTTP response, said program causing the computer to execute processing for transmitting a request based on an HTTP protocol to said request reception server, and attempting a reconnection to said request reception server when the reception of a response to the request is completed.

6. A recording non-transitory medium having stored thereon a program for causing a computer to execute a connection method performed in a client terminal for transmitting an HTTP request including an application identifier to a server system, said server system comprising:

a request reception server, a plurality of installed event message transmission servers, a client management server, and an application server, wherein:

said request reception server receives the HTTP request from said client device, and transfers the HTTP request to an event message transmission server, said client management server stores therein a set of said client device, which has made the HTTP request, and an event message transmission server to which the HTTP request is transferred, and is responsive to the HTTP request to transmit a server identifier of said event message transmission server, to which the HTTP request has been transferred, to said application server, said application server, upon receipt of the identifier of said event message transmission server after the HTTP request has been made, transmits an application identifier included in the HTTP request and an event message to an event message transmission server indicted by the server identifier, and said event message transmission server suspends the HTTP request transferred from said request reception server, and upon receipt of the event message from said application server, transmits the event message to the client device as an HTTP response, said recording non-transitory medium having stored thereon a program causing the computer to execute processing for transmitting a request based on an HTTP protocol to said request reception server, attempts a reconnection to said request reception server when the reception of a response to the request is completed.

* * * * *